United States Patent [19]

Martyniuk

[11] Patent Number: 5,195,606
[45] Date of Patent: Mar. 23, 1993

[54] EMERGENCY STOPPING APPARATUS FOR AUTOMOTIVE VEHICLES

[76] Inventor: Andrew Martyniuk, P.O. Box 164, Bensenville, Ill. 60106

[21] Appl. No.: 760,994

[22] Filed: Sep. 17, 1991

[51] Int. Cl.$^5$ .............................. B60T 7/08; B60T 7/14
[52] U.S. Cl. ........................................ 180/272; 303/18; 60/545
[58] Field of Search ................... 180/272, 275; 60/545; 303/18

[56] References Cited

U.S. PATENT DOCUMENTS

| 2,296,003 | 9/1942 | Van Loo | 180/272 |
|---|---|---|---|
| 2,674,852 | 4/1954 | Olman | 60/545 |
| 3,013,624 | 12/1961 | Remer | 180/272 |
| 3,082,414 | 3/1963 | Papaminas | 180/272 |
| 3,186,508 | 6/1965 | Lamont | 180/272 |
| 3,371,484 | 3/1968 | Julow | 60/545 |
| 4,209,075 | 6/1980 | Messina | 180/272 |
| 4,591,019 | 5/1986 | Fisher et al. . | |
| 4,795,189 | 1/1989 | Vollmer et al. . | |
| 4,799,570 | 1/1989 | Andersson et al. . | |
| 4,964,485 | 10/1990 | Miele | 180/275 |

FOREIGN PATENT DOCUMENTS

134032 8/1984 Japan .................................. 180/272

Primary Examiner—Karin L. Tyson
Attorney, Agent, or Firm—Palmatier & Zummer

[57] ABSTRACT

If the driver of a vehicle becomes partially or totally incapacitated, the driver or a passenger can operate the push button of a ratcheting push button switch so as to close contacts which energize an air compressor whereby compressed air is supplied to an air cylinder adapted to actuate the existing brakes on the vehicle. A collapsible toggle linkage is connected between the brake pedal and the piston rod of the cylinder whereby the cylinder can operate the pedal without interfering with the normal operation of the pedal. Alternatively, a flexible cable is connected between the pedal and the air cylinder. As another alternative, an air cylinder is connected between the brake pedal and a pushable member for actuating the brakes. A collapsible toggle linkage is connected between the brake pedal and the body of the vehicle to limit return movement of the pedal. As another alternative, compressed air is supplied to the pressure chamber of a vacuum brake booster by a three-way valve which is energized by the push button switch. The ignition system of the vehicle engine is disabled by additional contacts of the switch whereby the engine ceases to produce power and provides a braking action to assist in bringing the vehicle to a safe stop. Optionally, a sleep indicator and a heart monitor are each adapted to energize a relay having contacts which duplicate the functions of the push button switch so that the vehicle is stopped automatically if the driver loses consciousness or suffers a heart attack.

13 Claims, 4 Drawing Sheets

EMERGENCY STOPPING APPARATUS FOR AUTOMOTIVE VEHICLES

FIELD OF THE INVENTION

This invention relates to apparatus whereby a passenger in an automobile or some other automotive vehicle can activate the braking system of the vehicle in an emergency situation, simply by operating a push button or other switch, within easy reach of the passenger as well as the driver, so that the vehicle can be brought to a safe stop, in the event that the driver is suddenly incapacitated, as, for example by a heart attack or some other seizure. In accordance with the present invention, the operation of the switch may also disable the electrical ignition system of the vehicle, so that the engine of the vehicle no longer produces power but rather assists in the braking of the vehicle.

In accordance with another feature of the present invention, the emergency stopping apparatus may be activated automatically by a switching device which senses that the driver has been incapacitated.

BACKGROUND OF THE INVENTION

There have been prior vehicle stopping devices which activate the brakes of a motor vehicle if the vehicle strikes or closely approaches an obstacle, either in front of the vehicle or behind the vehicle. Some of these devices have used radar or sonar technology to ascertain that the vehicle is approaching an obstacle too closely or too rapidly. Such devices are expensive and sometimes unreliable.

Other prior devices have operated on the principle of having a mechanically movable feeler on the vehicle so that the feeler engages the obstacle and applies the brakes before the vehicle proper strikes the obstacle. Such devices have been used primarily to prevent the driver from damaging the vehicle by striking an obstacle when the vehicle is being backed up. The prior devices have been expensive and complex and have often required frequent repair.

OBJECTS OF THE INVENTION

One object of the present invention is to provide a new and improved apparatus which makes it very easy for a passenger in a motor vehicle to activate the braking system of the vehicle if the driver suddenly becomes partially or wholly incapacitated, by a heart attack or some other medical emergency, for example.

A further object is to provide a new and improved apparatus which enables either the passenger or the driver of the vehicle to activate the brakes of the vehicle with very little effort, so as to avoid a disastrous accident if an emergency situation develops in which the driver becomes partially or entirely incapacitated by a heart attack, a stroke or the like. Emergency situations of this kind are encountered rather frequently when vehicles are driven by elderly drivers.

Another object is to provide a new and improved apparatus which will disable the electrical ignition system of the vehicle, as well as activating the brakes, so that the motor of the vehicle will cease to generate power, but rather will assist in the braking of the vehicle.

A further object of the present invention is to provide a new and improved apparatus which is effective to activate the braking system and to disable the ignition system of the vehicle in response to the operation of an automatic sensing device which detects that the driver has become incapacitated.

A still further object of the present invention is to provide such a new and improved apparatus in which the sensing device may take the form of a slump switch which is operated if the head of the driver slumps down from its normally erect position, so as to indicate that the driver has lost consciousness.

Still another object of the present invention is to provide such a new and improved vehicle stopping apparatus which utilizes the existing brake system of a vehicle, but does not interfere with the normal operation of the brake system.

Still another object of the present invention is to provide a new and improved emergency stopping system having a power operated component connected to the brake pedal of the vehicle, without interfering with the normal operation of the brake pedal.

Another object of the present invention is to provide a new and improved vehicle stopping apparatus which is connected to the vacuum brake booster, found on many vehicles equipped with power brakes.

SUMMARY OF THE INVENTION

To achieve these and other objects, the present invention may comprise emergency stopping apparatus for an automotive vehicle having a brake system including a brake pedal operable by the driver in the cab of the vehicle, such apparatus comprising fluid power means mounted on the vehicle and operable by the application of fluid pressure to such fluid power means, connecting means for connecting the fluid power means to the brake pedal for actuating the brake pedal to apply the brakes in response to the application of fluid pressure to the fluid power means, such connecting means including a collapsible tension element to provide for normal operation of the brake pedal by the foot of the driver, fluid pressure source means for selectively supplying fluid pressure to the fluid power means, and control means for selectively causing the fluid pressure source means to supply fluid pressure to the fluid power means, the control means including switch means in the cab of the vehicle and operable by the driver or a passenger in the cab of the vehicle.

The apparatus may include additional means operable by the switch means for stopping the operation of the engine in the vehicle. Such additional means may include means for disabling the ignition system of the engine.

The switch means may comprise a push button switch in the cab of the vehicle and operable by the driver or a passenger therein. The switch means may also include slump switch means operable by slumping of the head of the driver for causing the fluid pressure source means to supply fluid pressure to the fluid power means.

The fluid power means may comprise a fluid pressure cylinder having mounting means on the vehicle, the cylinder having a movable component which is movable in response to the application of fluid pressure to the cylinder. The connecting means may comprise a collapsible toggle linkage connected between the movable component and the brake pedal for pulling the brake pedal in a direction to actuate the pedal and the brake system in response to the application of fluid pressure to the cylinder, the toggle linkage being collapsible to provide for normal pushing movement of the brake pedal by the foot of the driver.

The fluid power means may comprise a fluid pressure cylinder having mounting means on the vehicle. The cylinder may have movable means operable by the application of fluid pressure to the cylinder. The connecting means may comprise a flexible cable for connecting the movable means to the brake pedal for exerting a pulling force on the brake pedal to actuate the brake system in response to the application of fluid pressure to the cylinder, the flexible cable being collapsible to provide for normal pushing movement of the brake pedal by the foot of the driver.

The brake system may include pushable means for actuating the brake system. The fluid power means may include a fluid pressure cylinder. The connecting means may include means for connecting the cylinder between the pushable means and the brake pedal. The connecting means may also comprise a collapsible tension element connected between the brake pedal and the body of the vehicle for limiting the outward return movement of the pedal and thereby enabling the fluid pressure cylinder to exert a pushing force between the brake pedal and the pushable member.

The fluid pressure source means may comprise an air compressor having an electrically operable motor connected electrically to the switch means whereby operation of the switch means energizes the electrical motor and causes the air compressor to supply air pressure to the fluid power means.

In another aspect, the invention may provide emergency stopping apparatus for an automotive vehicle having a brake system including a brake pedal operable by the driver in the cab of the vehicle, the brake system including a pushable member for actuating the brake system, the apparatus comprising fluid power means operable by the application of fluid pressure to the fluid power means, the apparatus comprising connecting means for connecting the fluid power means between the pushable member and the brake pedal for producing a pushing movement of the pushable member relative to the brake pedal and thereby applying the brakes in response to the application of fluid pressure to the fluid power means, fluid pressure source means for selectively supplying fluid pressure to the fluid power means, and control means for selectively causing the fluid pressure source means to supply fluid pressure to the fluid power means, the control means including switch means in the cab of the vehicle and operable by the driver or a passenger therein.

Such apparatus may comprise means connected between the brake pedal and the body of the vehicle for limiting the outward return movement of the pedal and thereby enabling the fluid power means to exert a pushing force between the brake pedal and the pushable member.

The apparatus may comprise a collapsible tension element connected between the brake pedal and the body of the vehicle for limiting the outward return movement of the pedal and thereby enabling the fluid power means to exert a pushing force between the brake pedal and the pushable member.

The apparatus may comprise a collapsible toggle linkage connected between the brake pedal and the body of the vehicle for limiting the outward return movement of the pedal and thereby enabling the fluid power means to exert a pushing force between the brake pedal and the pushable member, the fluid power means and the collapsible toggle linkage being constructed and arranged to provide for the normal transmission of pushing movement between the brake pedal and the pushable member when the pedal is depressed by the foot of the driver.

The fluid power means may comprise a fluid pressure cylinder. The connecting means may include means for connecting the cylinder between the pushable member and the brake pedal whereby the fluid pressure cylinder is operative to move the pushable member relative to the brake pedal so as to apply the brakes.

In still another aspect, the invention may provide emergency stopping apparatus for an automotive vehicle having a brake system including a brake pedal operable by the driver in the cab of the vehicle, the brake system also including vacuum power brake means operable by the brake pedal for applying the brakes in response to movement of the pedal by the driver, the vacuum power brake means including a vacuum power housing having a diaphragm therein dividing the housing into a vacuum chamber and a pressure chamber normally supplied with atmospheric pressure, the apparatus comprising fluid pressure source means for producing compressed air at a pressure greater than atmospheric pressure, control means for selectively supplying the compressed air to the pressure chamber and thereby activating the brake system to cause the application of the brakes, the control means including switch means in the vehicle and operable by the driver or a passenger in the cab of the vehicle for selectively switching the control means between an initial state in which atmospheric pressure is supplied to the pressure chamber and an actuated state in which the compressed air is supplied to the pressure chamber to activate the brake system and thereby to apply the brakes.

The control means may comprise three-way valve means for alternately supplying atmospheric pressure and compressed air to the pressure chamber whereby the control means are changed between the initial state and the actuated state.

The valve means may comprise a solenoid for operating the valve means and thereby changing the control means between the initial state and the actuated state. The switch means may include electrical switch means for alternately energizing and de-energizing the solenoid.

The switch means may include additional electrical switch means for selectively disabling the ignition system of the engine in the vehicle and thereby stopping the operation of the engine simultaneously with the application of the brakes.

The fluid pressure source means may comprise an air compressor having an electrically operable drive motor, the electrical switch means including means for alternately energizing and de-energizing the motor simultaneously with the operation of the three-way valve.

The switch means may include means for detecting that the driver has become disabled and for switching the control means between the initial state and the actuated state in which the compressed air is supplied to the pressure chamber to activate the brake system.

In still another aspect, the invention may supply emergency stopping apparatus for an automotive vehicle having a brake system, such apparatus comprising power means for actuating the brake system to stop the vehicle, and control means for selectively energizing the power means to actuate the brake system, the control means including switch means in the cab of the vehicle and operable by the driver or a passenger therein, such switch means including additional electrical switch means for selectively disabling the ignition system of the engine in the vehicle and thereby stopping the operation of the engine simultaneously with the actuation of the brake system.

BRIEF DESCRIPTION OF THE DRAWINGS

Further objects, advantages and features of the present invention will appear from the following description, taken with the accompanying drawings, in which.

DETAILED DESCRIPTION OF ILLUSTRATIVE EMBODIMENTS

Figure 1:
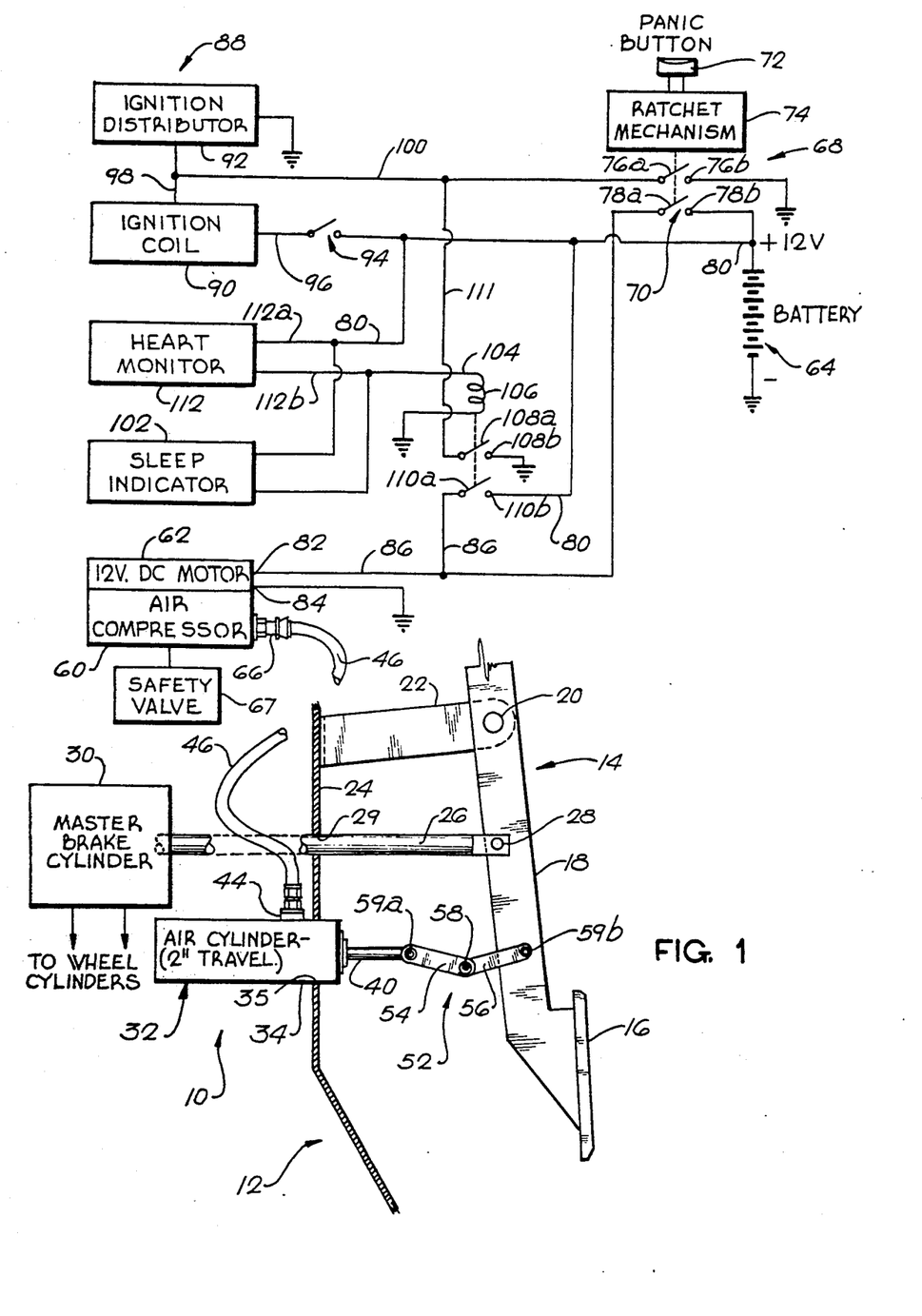
FIG. 1 is a diagrammatic view of an emergency stopping apparatus to be described as an illustrative embodiment of the present invention.

As just indicated, FIG. 1 is a diagrammatic illustration of emergency stopping apparatus 10 for an automobile or some other motor vehicle 12 of which only fragmentary portions are illustrated in FIG. 1. The motor vehicle 12 has a conventional brake system 14 including a brake pedal 16 which is operable by the foot of the driver to apply the brakes so that the vehicle 12 will be stopped or slowed down. The brake pedal 16 includes an arm 18 which is swingable about a pivot 20 on a bracket 22 mounted on a conventional fire wall 24 which is a component of the vehicle 12. The details of the brake system 14 will vary from one vehicle to another.

As shown in FIG. 1, the arm 18 of the brake pedal 16 is adapted to operate a pushable rod or member 26 which in this case has a pivotal connection 28 to the arm 18 of the brake pedal 16. The pushable member 26 extends through an opening 29 in the fire wall 24 and is connected, directly or indirectly, to a conventional master brake cylinder 30 for producing hydraulic pressure to operate wheel cylinders, not shown, of the brake system. While the invention is illustrated in connection with a hydraulic brake system 14, the invention is also applicable to air brake systems and mechanically actuated brake systems.

As shown in the embodiment of FIG. 1, the present invention provides power means for actuating the brake system 14, such power means preferably comprising fluid power means such as the illustrated air cylinder 32 having its body 34 mounted on and extending through an opening 35 in the fire wall 24.

Figures 2, 3, 4, 5, 6:
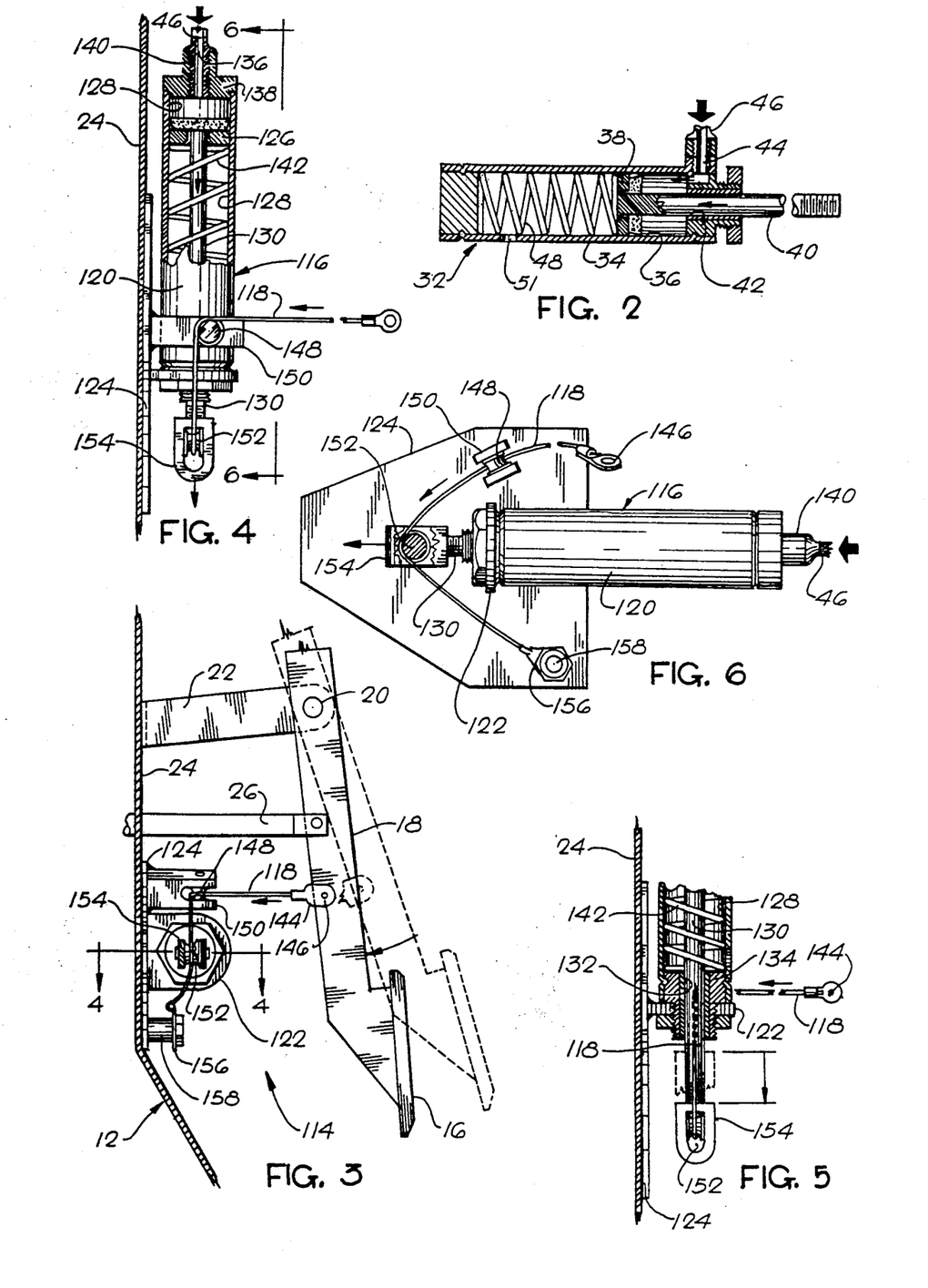
FIG. 2 is a longitudinal section taken through a fluid power cylinder employed in the apparatus of FIG. 1 for operating the brake pedal of the automotive vehicle.
FIG. 3 is a diagrammatic elevational section, corresponding to a portion of FIG. 1, but illustrating a modified embodiment utilizing a flexible cable trained around pulleys to afford an operative connection between the fluid power cylinder and the brake pedal.
FIG. 4 is a fragmentary plan view, partly in horizontal section taken through the fluid power cylinder, generally along the line 4—4 in FIG. 3.
FIG. 5 is a fragmentary horizontal section, taken longitudinally through the fluid power cylinder, generally along the same plane as represented by the line 4—4 in FIG. 3.
FIG. 6 is an elevational view showing the fluid power cylinder and its associated components, the view being taken generally as indicated by the line 6—6 in FIG. 4.

As shown in FIG. 2, the body 34 of the air cylinder 32 has a cylindrical bore 36 therein, for receiving a movable piston 38 connected to a piston rod 40 which extends slidably out of the body 34 through a sealed opening 42 which prevents any substantial leakage of compressed air from the cylinder 32. It will be understood that a hydraulic cylinder may be employed instead of the illustrated air cylinder 32.

The air cylinder 32 has an air inlet 44 through which compressed air can be admitted to the bore 36 of the cylinder 32. The air inlet 44 is adapted to be connected to an air hose or other conduit 46 for conducting compressed air to the cylinder 32.

As shown in FIG. 2, the illustrated air cylinder 32 has a return spring 48 in the form of a compression coil spring received in the bore 36 between the piston 38 and an end wall 50 closing the left hand end of the cylindrical body 34. A vent opening 51 is provided to connect the left hand end portion of the cylinder bore 36 to the atmosphere. When compressed air is supplied through the inlet 44 to the right hand end of the cylinder bore 36, the piston 38 is pushed to the left so as to compress the coil spring 48. When the compressed air is allowed to escape through the inlet 44, the spring 48 returns the piston 38 and the piston rod 40 to the right. The piston 38 and the piston rod 40 may have a stroke of approximately two inches, for example.

As shown in FIG. 1, a collapsible connection is provided between the piston rod 40 and the brake pedal 16, such collapsible connection being illustrated as a toggle linkage 52 comprising toggle links 54 and 56, pivotally connected together by a pivot 58 which forms the central joint of the toggle linkage 52. The opposite ends of the links 54 and 56 are pivotally connected to the piston rod 40 and the arm 18 of the brake pedal by pivots 59a and 59b.

The toggle linkage 52 forms a tensile connection between the piston rod 40 and the brake pedal 16, adapted to transmit a pulling force or tension therebetween. However, the toggle linkage 52 does not interfere with the normal pushing movement of the brake pedal 16 by the foot of the driver, because the toggle linkage 52 collapses and articulates about its central pivot 58, when the brake pedal 16 is pushed to the left as shown in FIG. 1.

The emergency stopping apparatus 10 of FIG. 1 includes fluid pressure source means for selectively supplying fluid pressure to the fluid power cylinder 32, such fluid pressure source means being illustrated diagrammatically as comprising a commercially available air compressor 60 operable by a self-contained electrical motor 62, adapted to be energized by an electrical voltage such as 12 volts direct current (DC), supplied by a 12-volt storage battery 64, carried by the vehicle in accordance with the conventional practice. The vehicle also comprises means, not shown, for charging the battery 64. The air compressor 60 may also include an adjustable pressure regulator, not shown separately.

Figure 8:
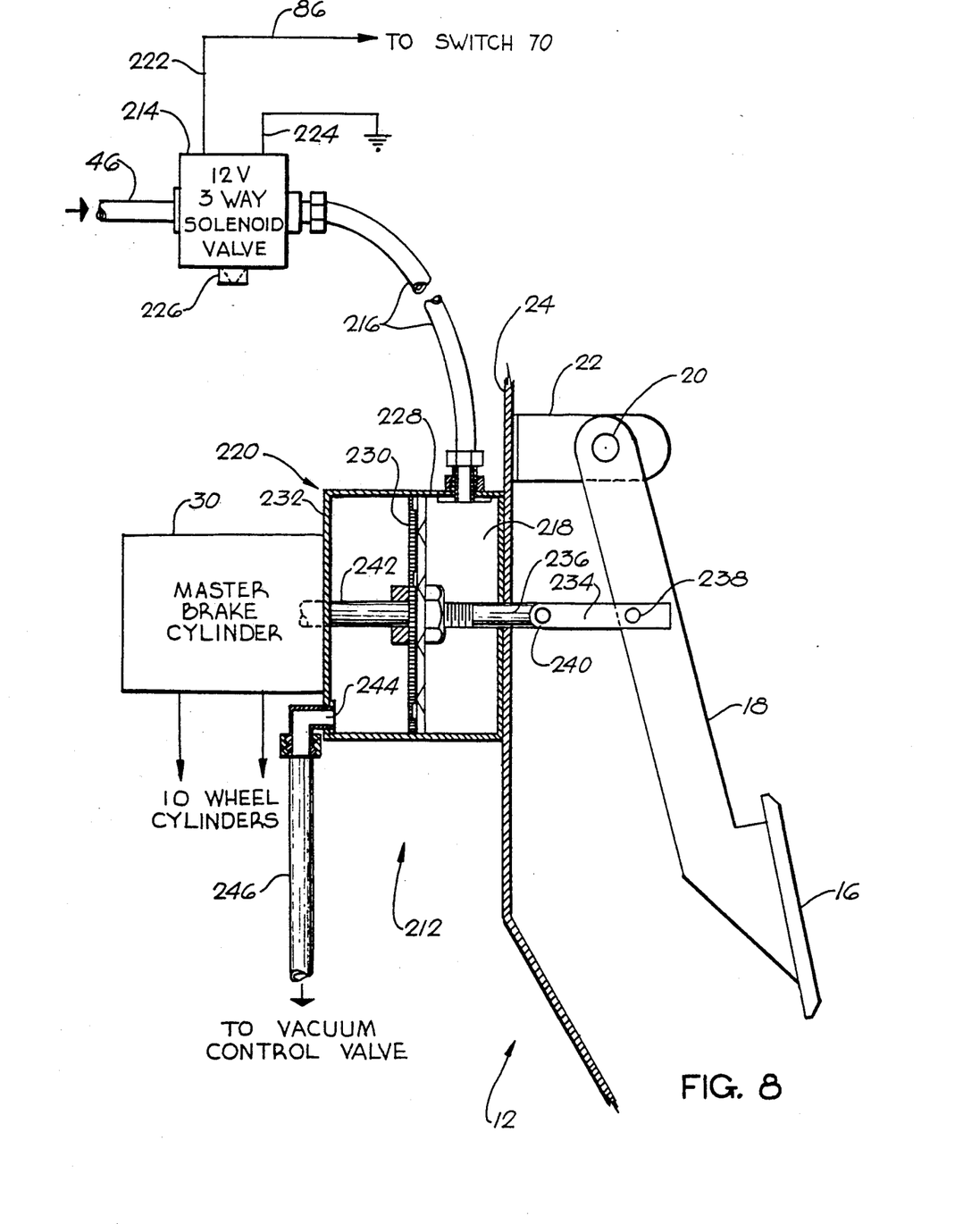
FIG. 8 is a fragmentary diagrammatic elevational section, corresponding generally to a portion of FIG. 1, but showing still another modified embodiment of the present invention.

In this case, the air compressor 60 has a compressed air outlet 66 which is connected directly to the hose 46 leading to the air inlet 44 of the air cylinder 32. However, a three-way solenoid valve could be connected into the hose 46 as shown in the embodiment of FIG. 8, which will soon be described herein. The illustrated air compressor 60 is provided with a conventional safety valve 67 for venting excess pressure to the atmosphere.

When the 12-volt motor 62 of FIG. 1 is energized, it operates the air compressor 62 which produces compressed air at a sufficient pressure to actuate the air cylinder 32 so that it straightens the toggle linkage 52 and pulls the brake pedal 16 to the left so as to apply the brakes. Thus, the vehicle is brought to a safe stop. When the motor 62 is de-energized, the air compressor 60 stops operating and the air pressure at the outlet 66 dissipates, so that the piston 38 and the piston rod 40 are returned to the right by the return spring 48. The brake pedal 16 is also returned to the right by its conventional return spring, not shown, so that the brakes are no longer applied.

If the driver later applies the brakes normally, by pushing on the brake pedal 16 with his foot, the toggle linkage 52 collapses, in that the toggle links 54 and 56 swing or jackknife in opposite directions about the pivot 58, so that the toggle linkage 52 does not interfere with the normal application of the brakes.

The emergency stopping apparatus 10 of FIG. 1 also comprises control means for selectively causing the fluid pressure source means to supply fluid pressure to the fluid power means, such control means including switch means 68. As shown in FIG. 1, the switch means 68 comprise an electrical switch 70 operable by means of a push button or panic button 72, readily accessible to both the driver and a passenger in the cab of the vehicle 12. The push button 72 is adapted to operate a conventional ratchet mechanism 74 which imparts a push-push action to the switch 70. Thus, a first push on the button 72 causes the switch 70 to close, while a second push causes the switch to open. In other words, alternate pushes on the button 72 cause the switch 70 to open and close.

The switch 70 of FIG. 1 is of the double-pole single-throw type, although a single-pole single-throw switch could be used. Thus, the switch 70 has movable contacts 76a and 78a which are engageable with corresponding fixed contacts 76b and 78b. The movable contacts 76a and 78a are ganged together and are operable by the push button 72 through the ratchet mechanism 74. The positive terminal of the battery 64 is connected to a positive supply line 80 having several branches, all of which are designated 80. The negative terminal of the battery 64 is connected to the metal frame of the vehicle, as represented in all cases by the ground symbol. It will be seen that the fixed switch terminal 76b is connected to ground, while the fixed switch terminal 78b is connected to the positive supply line 80.

The illustrated motor 62 of the air compressor 60 has positive and negative electrical terminals 82 and 84. The positive terminal 82 is connected by a conductor 86 to the movable contact 78a of the push button switch 70. The negative terminal 84 of the motor is connected to ground. Thus, closure of the switch 70 energizes the motor 62 so that the air compressor 60 is operated. Accordingly, the air cylinder 32 pulls on the arm 18 of the brake pedal 16 so as to apply the brakes. When the switch 70 is opened by a second push on the push button 72, the motor 62 is de-energized, whereupon the air compressor 60 stops and the brakes are released.

In accordance with another feature of the present invention, the emergency stopping apparatus 10 of FIG. 1 also comprises means operable by the switch 70 for disabling the engine of the vehicle 12 so that it no longer produces power, but rather has a braking action. As specifically illustrated in FIG. 1, the closure of the switch 70 is adapted to disable the electrical ignition system 88 of the engine. The illustrated ignition system 88 comprises a conventional ignition coil 90 and a conventional ignition distributor 92. A conventional ignition switch 94 is connected between the positive supply line 80 and one terminal lead 96 of the ignition coil 90. The ignition distributor 92 is connected between the other terminal lead 98 of the ignition coil and ground. It will be understood that the ignition distributor 92 is adapted to make and break the circuit through the ignition coil, so that the ignition coil produces the high voltage spark impulses which are supplied to the spark plugs of the engine. As shown, a conductor 100 is connected between the terminal lead 98 and the movable switch contact 76a, so that closure of the switch 70 connects the terminal lead 98 to ground, whereby the ignition distributor 92 is unable to break the electrical current through the ignition coil 90. In other words, the ignition distributor 92 is short-circuited to ground, so that the distributor is effectively disabled. In this way, the ignition system 88 is disabled. However, nothing else on the vehicle is disrupted. Thus, all of the lights and the other electrical devices on the vehicle remain operative. When the switch 70 is opened by a second push on the push button 72, the ignition system is again rendered operative.

To supplement the manually-operable push button switch 70 for stopping the vehicle, the emergency stopping apparatus of FIG. 1 may comprise one or more sensor means for detecting that the driver has become disabled and for stopping the vehicle in the same manner as if the switch 70 had been operated. Thus, the illustrated apparatus 10 comprises a sleep indicator 102 which detects that the driver has fallen asleep or has otherwise lost consciousness, as, for example, due to a heart attack or some other seizure. The sleep indicator 102 preferably takes the form of a slump switch which detects that the driver's head has slumped down from its normally erect position. The slump switch may comprise a position-sensitive mercury switch which is closed in response to the slumping of the driver's head. The slump switch is mounted on a cap or some other headgear worn by the driver. If the driver falls asleep and his head nods momentarily, he will ordinarily be awakened by the application of the brakes on the vehicle. If the driver does not awaken immediately, the vehicle 12 will be brought to a safe stop.

The sleep indicator or slump switch 102 is connected between the positive electrical supply line 80 and one terminal lead 104 of a relay-coil 106, the other terminal of which is connected to ground. The relay coil 106 is adapted to operate movable relay contacts 108a and 110a which are movable by the relay coil 106 into engagement with fixed contacts 108b and 110b, respectively. The contacts 108a and 108b are connected in parallel with the contacts 76a and 76b. Thus, the movable contact 108a is connected to the movable contact 76a by a conductor 112 and the conductor 100. The fixed contact 108b is connected to ground, as in the case of the fixed contact 76b. The movable contact 110a is connected to a branch of the conductor 86 which is also connected to the movable contact 78a. The fixed contact 110b is connected to a branch of the positive supply line 80 which is also connected to the fixed contact 78b. When the relay coil 106 is energized by the sleep indicator or slump switch 102, the closure of the contacts 108a and 108b energizes the motor 62 for the air compressor 60 so that compressed air is supplied to the air cylinder 82 which is operative to apply the brakes, as previously described. The closure of the contacts 110a and 110b disables the ignition system of the vehicle by short-circuiting the ignition distributor 92, as previously described.

The emergency stopping apparatus 10 may also comprise a heart monitor 114 having terminals 116 and 118 connected in parallel with the sleep indicator or slump switch 102 between the positive power supply lead 80 and the terminal lead 104 of the relay coil 106. The heart monitor 114 is of a conventional construction having a sensor worn by the driver to sense the pulse rate and/or the blood pressure of the driver. If the pulse rate and/or the blood pressure become abnormal to a predetermined extent, the heart monitor 114 closes an electrical circuit between the positive power supply lead 80 and the terminal 104 of the relay coil 106 so that the coil is energized, whereby the brakes are applied and the ignition system of the engine on the vehicle is disabled, as previously described.

It may be helpful to summarize the operation of the emergency stopping apparatus 10 of FIG. 1. If the driver of the vehicle becomes partially or entirely disabled, as by a heart attack or the like, either the driver or the passenger may operate the push button switch 70 by pushing the push button 72. The resulting closure of the contacts 78a and 78b energizes the motor 62 of the air compressor 60 by connecting the motor across the battery 64. The consequent operation of the air compressor 60 produces compressed air which is supplied to the air cylinder 32 by the hose 46.

The compressed air in the bore 36 of the cylinder 32 pushes the piston 38 and the piston rod 40 to the left, whereby the toggle linkage 52 is straightened and the arm 18 of the brake pedal 16 is pulled to the left as shown in FIG. 1. The consequent movement of the pushable member 26 actuates the master brake cylinder 30 and applies the brakes.

The operation of the push button switch 70 also closes the switch contacts 76a and 76b so as to short-circuit the ignition distributor 92, whereby the ignition coil 90 ceases to produce high-voltage spark impulses, so that the ignition system 88 of the vehicle is disabled. The engine of the vehicle stops producing power and produces a braking action instead.

Thus, the application of the brakes and the disabling of the ignition system bring the vehicle 12 to a safe stop. The normal operation of the vehicle may again be enabled by pushing the push button 72 a second time so as to open the switch contacts 76a, 76b, 78a and 78b. The opening of the switch contacts 76a and 76b removes the short circuit across the ignition distributor 92 so as to restore the ignition system to its normal operating condition. The opening of the contacts 78a and 78b de-energizes the motor 62 so that the air compressor 60 ceases to produce compressed air. The air pressure in the air cylinder 32 is dissipated so that the piston 38 and the piston rod 40 are returned to the right by the return spring 48. Thus, the brake pedal 16 is allowed to return to the right so as to release the brakes. If the driver pushes on the brake pedal 16, the toggle linkage 52 collapses by virtue of swinging movement of the toggle links 54 and 56 about the pivot 58, so that the linkage 52 does not interfere with the normal operation of the brakes.

If the driver falls asleep or otherwise loses consciousness, the sleep indicator or slump switch 102 closes an energizing circuit to the relay coil 106 which causes closure of the relay contacts 108a, 108b, 110a and 110b. Such closure has the same effect as the closure of the push button switch 70, so that the brakes are applied and the ignition system 88 is disabled. If the heart monitor 112 detects that the heart action of the driver departs to a predetermined extent from its normal parameters, the heart monitor 112 energizes the relay coil 106 so as to apply the brakes and disable the ignition system, as just described.

FIGS. 3-6 illustrate a second embodiment of the present invention in the form of a modified emergency stopping apparatus 114 which differs from the first embodiment 10, in that the air cylinder 32 is replaced by a modified air cylinder 116 which is connected to the arm 18 of the brake pedal 16 by a flexible tension member in the form of a highly flexible cable 118 guided by a system of pulleys to be described presently. As before, the air cylinder 116 serves as the fluid power means for swinging the brake pedal 16 to the left so as to apply the brakes. Except for the constructional details of the air cylinder 116, the cable 118 and the pulley system, the emergency stopping apparatus 114 is the same as illustrated in FIG. 1. FIG. 3 illustrates only the portions of the emergency stopping apparatus which are different from the corresponding portions of the emergency stopping apparatus 10 of FIG. 1. To avoid repetition of description, the same reference characters have been applied to the components shown in FIGS. 3-6 as were applied to the substantially similar components of FIG. 1. Only the distinctive features of the modified emergency stopping apparatus 114 will be described in detail.

The air cylinder 116 of FIGS. 3-6 comprises a generally cylindrical body 120 which is mounted in front of the fire wall 24 of the vehicle 12. Specifically, the body 120 is mounted on a bracket 122 which projects forwardly from a mounting plate 124, suitably secured to the fire wall 24.

A piston 126 is slidable along a cylindrical bore 128 in the cylindrical body 120 and is connected to a piston rod 130 which is slidable along a sealed opening 132 extending through an end wall 134 at one end of the body 120. An inlet 136 for compressed air extends through the opposite end wall 138 of the body 120. The compressed air supply hose 46 is connected to the air inlet 136 by a suitable coupler fitting 140 on the end wall 138.

The air cylinder 116 has a return spring in the form of a compression coil spring 142 received in the bore 128 and compressible between the piston 126 and the end wall 134 through which the piston rod 130 is slidable. When compressed air is supplied to the cylinder 116, the piston rod 130 is pushed out of the cylinder against the biasing action of the return spring 142.

On end of the flexible cable 118 is secured to a terminal lug 144 which is connected to the arm 18 of the brake pedal 16 by a pivotal connection 146. A pulley system is provided to guide the cable 118 so that it exerts a pull or tensile force on the brake pedal 16 in response to the outward pushing movement of the piston rod 130. As shown, the pulley system comprises a first pulley 148 rotatably mounted on a stationary bracket 150 and a second pulley 152, rotatably mounted on a supporting member 154 secured to the outer end of the piston rod 130. The stationary bracket 150 is welded or otherwise suitably secured to the mounting plate 124. The flexible cable 118 extends from the connecting lug 144 on the arm 18 of the brake pedal 16 and then is trained successively around the first and second pulleys 148 and 152. After departing from the pulley 152, the cable 118 extends to a stationary anchoring lug 156 to which the end of the cable is suitably secured. The anchoring lug 156 is connected to a stationary post 158, suitably secured to the mounting plate 124.

As shown most clearly in FIGS. 3 and 4, the direction of the flexible cable 118 is changed through approximately ninety degrees in passing around the first pulley 148. The direction of the cable 118 is changed through an even greater angle in passing around the second pulley 152.

When compressed air is supplied to the air cylinder 116, the piston rod 130 is moved out of the cylindrical body 120. The supporting member 154 on the piston rod 130 is pushed horizontally and to the left, as shown in FIG. 6, so that the second pulley 152 exerts a tensile or pulling force on the cable 118. The tensile force is transmitted by the lug 144 and the pivotal connection 146 to the arm 18 of the brake pedal 16, so that the brake pedal 16 is swung to the left, as shown in FIG. 3, whereby the brakes are applied, in the same manner as described in connection with the embodiment of FIG. 1. When compressed air is no longer supplied to the cylinder 116 by the air compressor 60 of FIG. 1, the air pressure in the cylinder 116 is dissipated and the piston rod 130 is returned into the cylindrical body 120 by the return spring 142. The corresponding movement of the second pulley 152, to the right, as seen in FIG. 6, relieves the tensile force on the cable 118 so that the brake pedal 16 is returned to the right, as seen in FIG. 3, by its own return spring, not shown. The flexible cable 118 acts as a collapsible tension member and does not interfere with the movement of the brake pedal 16 to the left by the foot of the driver. Such movement of the brake pedal 16 merely produces flexure and slack in the cable 118.

Figure 7:
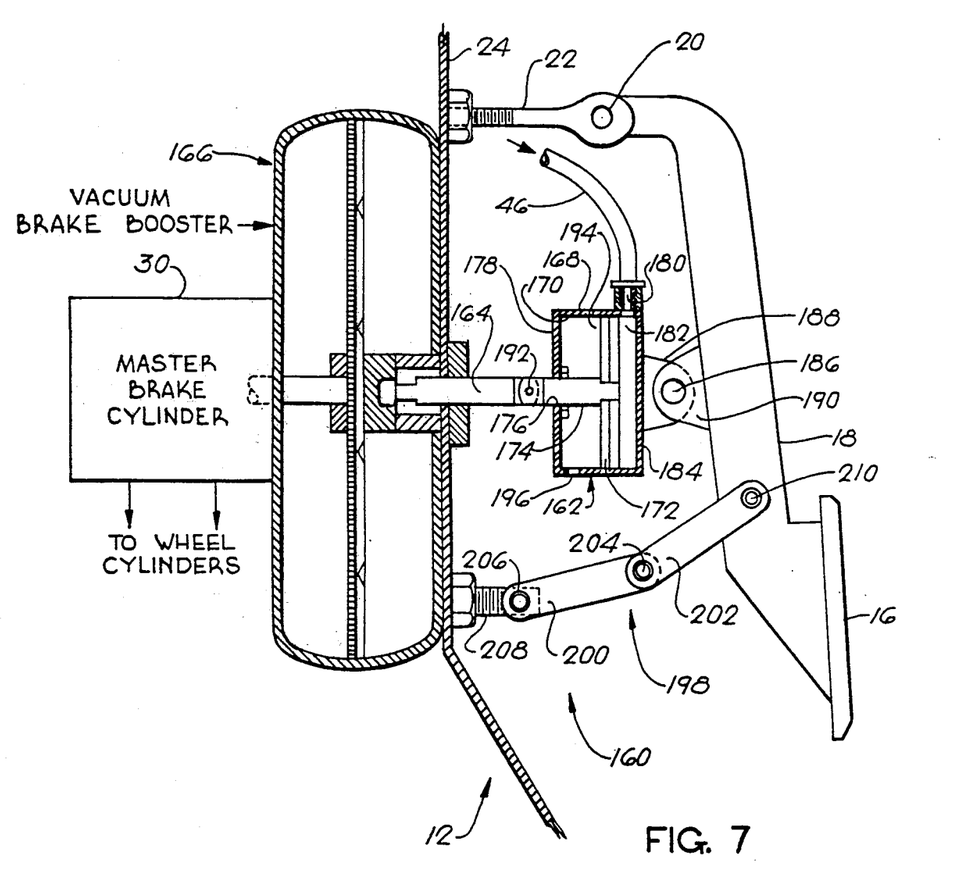
FIG. 7 is a fragmentary diagrammatic elevational section, corresponding to a portion of FIG. 1, but showing another modified embodiment of the present invention.

FIG. 7 illustrates another modified embodiment of the present invention in the form of a modified emergency stopping apparatus 160 which differs from the apparatus 10 of FIGS. 1 and 2 in that the air cylinder 32 is omitted and is replaced with an air cylinder 162 which is connected between the arm 18 of the brake pedal 16 and a pushable member 164 which is similar to and corresponds generally with the pushable member 26 of FIG. 1. In this case, a vacuum brake booster 166 is interposed between the pushable member 164 and the master brake cylinder 30, to provide vacuum-boosted power brakes which are conventional and well-known. A vacuum brake booster could also be employed in connection with the emergency stopping apparatus 10 of FIG. 1.

The air cylinder 162 provides the power means for moving the brake pedal 16 to the left, as viewed in FIG. 7, for actuating the brakes. The air cylinder 162 comprises a generally cylindrical body 168 having a substantially cylindrical bore 170 therein for slidably receiving a piston 172 from which a piston rod 174 extends out of the cylindrical body 168 through an opening 176 in the left-hand end wall thereof. The compressed air supply hose 46 is adapted to be connected to an air inlet 180 communicating with a substantially cylindrical chamber 182 in the right-hand portion of the cylindrical bore 17 between the piston 172 and the right-hand end wall 184 of the body 168.

As shown in FIG. 7, a pivotal connection 186 is provided between a bracket 188 on the end wall 184 and a bracket 190 on the arm 18 of the brake pedal 16. Another pivotal connection 192 is provided between the piston rod 174 and the pushable member 164. The air cylinder 162 has a second chamber 194 comprising the portion of the cylindrical bore 170 between the piston 172 and the left-hand end wall 178 of the cylindrical body 168. The chamber 194 is vented to the atmosphere by a vent opening 196 formed in the cylindrical body 168.

The emergency stopping apparatus 160 comprises stop means for positively limiting swinging movement of the brake pedal 16 to the right or in its return direction, as viewed in FIG. 7, such stop means being illustrated as a collapsible toggle linkage 198 comprising toggle links 200 and 202 having a pivotal connection 20 therebetween. The opposite end of the link 200 is provided with another pivotal connection 206 with a bracket 208 on the fire wall 24. Similarly, the opposite end of the link 202 is provided with a pivotal connection 210 between the link 202 and the arm 18 of the brake pedal 16.

Except as described above in detail, the emergency stopping apparatus 160 of FIG. 7 is the same as the apparatus 10 of FIG. 1. When the push button switch 70 of FIG. 1 is closed in response to the operation of the push button 72 by the driver or a passenger, the motor 62 of the air compressor 60 is energized so that the compressor 60 supplies compressed air through the hose 46 to the air cylinder 162 of FIG. 7. The compressed air in the chamber 182 pushes the piston 172 to the left while pushing the cylindrical body 168 to the right. The pivotal connection 186 transmits the movement of the cylindrical body 168 to the arm 18 of the brake pedal 16, so that the brake pedal 16 is moved to the right until such movement is limited by the straightening of the toggle linkage 198 which thereafter prevents any further movement of the brake pedal 16 to the right. The piston 172 and the piston rod 174 move the pushable member 164 to the left so as to actuate the vacuum brake booster 166 and the master brake cylinder 30, whereby the brakes are applied to bring the vehicle to a safe stop. When the switch 70 of FIG. 1 is opened by a second push on the push button 72, as previously described in connection with FIG. 1, the motor 62 is deenergized so that the air compressor 60 is stopped, whereby the air pressure in the hose 46 and the piston chamber 182 is dissipated. Accordingly, the brakes are released. The air cylinder 168 does not interfere with the normal movement of the brake pedal 16 to the left, so that the driver's ability to apply the brakes is not impaired. When the driver pushes with his foot on the brake pedal 16, the toggle linkage 198 collapses so that the linkage does not interfere with the normal application of the brakes.

FIG. 8 illustrates still another modified embodiment of the present invention, in the form of a modified emergency stopping apparatus 212 which differs from the emergency stopping apparatus 10 of FIG. 1, in that the air cylinder 32 is omitted, and the compressed air from the air compressor 60 is supplied by the hose 46 to a three-way solenoid valve 214, constituting means for selectively supplying the compressed air through another hose 216 to a pressure chamber 218 of an otherwise conventional vacuum brake booster 220, whereby the brakes are applied.

As shown in FIG. 8, the solenoid of the three-way valve 214 has electrical terminal leads 222 and 224 adapted to be connected across the 12-volt battery 64 of FIG. 1 when the push button switch 70 is closed by the depression of the push button 72. Specifically, the terminal lead 224 is connected to ground while the terminal lead 222 is connected to one of the branches of the conductor 86 which extends to the movable contact 76a of the switch 70 of FIG. 1. When the switch 70 is closed, the movable contact 78a engages the fixed contact 78b which is connected to the positive supply line 80 from the battery 64.

When the three-way solenoid valve 214 of FIG. 8 is electrically energized, the valve 214 connects the compressed air inlet hose 46 to the outlet hose 216 so that the compressed air from the compressor 60 is supplied to the pressure chamber 218 of the vacuum brake booster 220, whereby the brakes are applied. When the three-way solenoid valve 214 is de-energized by the opening of the push button switch 70, the hose 216 is vented to the atmosphere through a vent outlet 226 on the valve 214. In this way, the chamber 218 is vented to the atmosphere.

The pressure chamber 218 of the vacuum brake booster 220 is formed in a vacuum brake booster housing 228 which may be of a known conventional construction, except for the arrangement whereby the pressure chamber 218 can be selectively supplied with compressed air, in order to apply the brakes in an emergency situation. In the housing 228, the pressure chamber 218 is separated by a movable diaphragm 230 from a vacuum chamber 232.

The arm 18 of the brake pedal 16 is connected by means of a link 234 to a pushable member 236 having a connection to the diaphragm 230. The opposite ends of the link 234 are connected to the arm 18 and the pushable member 236 by pivotal connections 238 and 240, respectively. When the brake pedal 16 is pushed to the left to apply the brakes in the normal manner, the movement of the pushable member 236 operates a conventional vacuum control valve, not shown, adapted to connect the vacuum chamber 232 to a vacuum source, not shown, such as the intake manifold of the engine in the vehicle. Another pushable member 242 is connected between the movable diaphragm 230 and the master brake cylinder 30. The housing is formed with a vacuum supply opening 244 communicating with the vacuum chamber 232 and adapted to be connected to the vacuum control valve, not shown, by a suitable conduit 246.

When the driver pushes with his foot on the brake pedal 16, the pushing force is transmitted by the link 23 to the pushable member 236 and then successively to the diaphragm 230, the second pushable member 242 and the master brake cylinder 30. A partial vacuum is produced in the vacuum chamber 232 by the operation of the vacuum control valve, not shown. The atmospheric pressure in the chamber 218 presses on the diaphragm 230 and augments the force being exerted on the second pushable member 242 by the foot of the driver. When the driver stops pushing on the brake pedal 16, it returns to the right, as viewed in FIG. 8. Similarly, the link 234, the first pushable member 236, the diaphragm 230 and the second pushable member 244 also return to the right, so that the brakes are released. The chamber 232 is vented to the atmosphere by the vacuum control valve, not shown.

If the driver should become partially or totally incapacitated, either the driver or a passenger in the cab of the vehicle 12 can depress the push button 72 so as to close the switch 70. The closure of the switch contacts 78a and 78b connects the positive voltage supply line 80 to the conductor 86 and then to the terminal lead 22 of the three-way solenoid valve 214, so that the valve is electrically energized. The consequent operation of the valve 214 disconnects the hose 216 from the atmospheric vent 226 and connects the hose 216 to the compressed air supply hose 46 which receives compressed air from the air compressor 60. As described previously in connection with FIG. 1, the closure of the push button switch 70 also energizes the air compressor 60 so that it produces compressed air. The hose 216 carries the compressed air to the pressure chamber 218 so that the compressed air pushes the diaphragm 230 and the second pushable member 244 to the left, as viewed in FIG. 8, whereby the master cylinder 30 is operated and the brakes are applied so as to bring the vehicle 12 to a safe stop. It will be understood that the combination of the air compressor 60, the three-way solenoid valve 214 and the booster housing 228, together with the associated components, constitutes power means for applying the brakes in response to the operation of the push button control switch 70.

The brakes can be released by again pushing the push button 72 so as to open the switch 70, whereby the air compressor 60 and the three-way solenoid valve 214 are deenergized. The valve 214 connects the hose 216 to the atmospheric vent 226 so that the pressure in the chamber 218 returns to atmospheric pressure. In this way, the brakes are released.

When the solenoid valve 214 is deenergized, the chamber 218 is vented to the atmosphere so that the vacuum brake booster 220 functions in a completely normal manner. Thus, the emergency stopping apparatus 212 of FIG. 8 does not interfere with the normal operation of the brakes when the driver pushes with his foot on the brake pedal 16.

Various other modifications, alternative constructions and equivalents may be employed without departing from the true spirit and scope of the present invention as described herein and as defined in the following claims.

I claim:

1. Emergency stopping apparatus for an automotive vehicle having a brake system including a brake pedal operable by the driver in the cab of the vehicle, said apparatus comprising fluid power means mounted on the vehicle and operable by the application of compressed air to said fluid power means, a collapsible tension element for connecting said fluid power means to the brake pedal for actuating the brake pedal to apply the brakes in response to the application of compressed air to said fluid power means, a selectively operable air compressor for selectively supplying compressed air to said fluid power means, said air compressor having an electrically operable drive motor for driving said air compressor, the vehicle having an electrical battery for energizing the drive motor, and a latching push button switch having alternate open and closed positions and connected directly between the battery and the drive motor for energizing the drive motor and thereby causing the air compressor to supply compressed air to the fluid power means when the switch is in its closed position whereby the fluid power means actuates the brake pedal, the latching push button switch being mounted in the cab of the vehicle and being operable by the driver or a passenger in the cab of the vehicle.

2. Apparatus according to claim 1,
in which said switch includes first switch contacts operable between open and closed positions for energizing the drive motor,
said switch including second switch contacts operable between open and closed positions for disabling the ignition system of the engine in the vehicle.

3. Apparatus according to claim 1,
in which said fluid power means comprise a fluid pressure cylinder having mounting means on the vehicle,
said cylinder having a movable component which is movable in response to the application of compressed air to said cylinder,
said tension element comprising a collapsible toggle linkage connected between said movable component and the brake pedal for pulling the brake pedal in a direction to actuate the pedal and the brake system in response to the application of compressed air to said cylinder.

4. Emergency stopping apparatus for an automotive vehicle having a brake system including a brake pedal operable by the driver in the cab of the vehicle,
the brake system including a pushable member for actuating the brake system,
said apparatus comprising fluid power means operable by the application of compressed air to said fluid power means,
connecting means for connecting said fluid power means between the pushable member and the brake pedal for producing a pushing movement of the pushable member relative to the brake pedal and thereby applying the brakes in response to the application of compressed air to the fluid power means,
an air compressor connected to said fluid power means for supplying compressed air thereto,
said air compressor having an electrically operable drive motor for operating said air compressor,
the vehicle having an electrical battery,
and a latching push-push action push button switch connected between the battery and said electrically operable drive motor,
said switch having alternate open and closed positions and being operative in said closed position to energize the drive motor whereby the air compressor supplies compressed air to the fluid power means so as to actuate the brake system,
said switch being mounted in the cab of the vehicle and being operable by the driver or a passenger therein for stopping the vehicle in an emergency.

5. Apparatus according to claim 4,
comprising means connected between the brake pedal and the body of the vehicle for limiting the outward return movement of the pedal and thereby enabling the fluid power means to exert a pushing force between the brake pedal and the pushable member.

6. Apparatus according to claim 4,
comprising a collapsible toggle linkage connected between the brake pedal and the body of the vehicle for limiting the outward return movement of the pedal and thereby enabling said fluid power means to exert a pushing force between the brake pedal and the pushable member,
said fluid power means and said collapsible toggle linkage being constructed and arranged to provide for the normal transmission of pushing movement between the brake pedal and the pushable member when the pedal is depressed by the foot of the driver.

7. Apparatus according to claim 4,
in which said switch comprises first switch contacts operable between open and closed positions for energizing said drive motor of said air compressor,
said switch means including second switch contacts operable between open and closed positions for disabling the ignition system of the engine.

8. Emergency stopping apparatus for an automotive vehicle having a brake system including a brake pedal operable by the driver in the cab of the vehicle,
the brake system also including vacuum power brake means operable by the brake pedal for applying the brakes in response to movement of the pedal by the driver,
the vacuum power brake means including a vacuum power housing having a diaphragm therein dividing the housing into a vacuum chamber and a pressure chamber normally supplied with atmospheric pressure,
said apparatus comprising an air compressor for selectively supplying compressed air to said pressure chamber at a pressure greater than atmospheric pressure,
said air compressor having an electrically operable drive motor for driving said air compressor,
the vehicle having an electrical battery for energizing the drive motor,
and a latching push button switch having alternate open and closed positions and connected directly between the battery and the drive motor for energizing the drive motor and thereby causing the air compressor to supply compressed air to the pressure chamber of said vacuum power brake means when said switch is in its closed position whereby the vacuum power brake means actuates the brake system,
the latching push button switch being mounted in the cab of the vehicle and being operable by the driver or a passenger in the cab of the vehicle for stopping the vehicle in an emergency situation.

9. Emergency stopping apparatus according to claim 8,
in which said switch comprises switch contacts operable between open and closed positions for connecting the drive motor to the battery,
the apparatus comprising an electrically operable valve connected to said switch contacts for venting said pressure chamber to the atmosphere when said switch contacts are in their open position.

10. Apparatus according to claim 8,
in which said switch comprises switch contacts operable between open and closed positions for energizing said driving motor of said air compressor when said switch contacts are in their closed position,
said apparatus including a solenoid operated three-way valve having a solenoid connected to said switch contacts for energization when said switch contacts are in their closed position, said three-way valve having means for connecting said pressure chamber to atmospheric pressure when said switch contacts are in their open position and for connecting said pressure chamber to said air compressor when said switch contacts are in their closed position.

11. Emergency stopping apparatus for an automotive vehicle having a brake system including a brake pedal operable by the driver in the cab of the vehicle, said apparatus comprising fluid power means connected to the brake pedal and operable by the application of compressed air to said fluid power means for actuating the brake system, a selectively operable air compressor for selectively supplying compressed air to said fluid power means, said air compressor having an electrically operable drive motor for driving said air compressor, the vehicle having an electrical battery for energizing the drive motor, and a latching push button switch having alternate open and closed positions and connected directly between the battery and the drive motor for energizing the drive motor and thereby causing the air compressor to supply compressed air to the fluid power means when the switch is in its closed position whereby the fluid power means actuates the brake system, the latching push button switch being mounted in the cab of the vehicle and being operable by the driver or a passenger in the cab for stopping the vehicle in an emergency situation.

12. Apparatus according to claim 11,
in which the fluid power means is mounted on the vehicle,
said fluid power means being connected to the brake pedal for actuating the brake pedal in response to the application of compressed air to the fluid power means.

13. Apparatus according to claim 11,
in which the brake system includes a pushable member for actuating the brake system,
said fluid power means being connected between the brake pedal and the pushable member for actuating the brake system in response to the application of compressed air to the fluid power means.

* * * * *